April 21, 1953  G. A. PRUSER  2,635,407
COTTON HARVESTING MACHINE
Filed Dec. 12, 1950  3 Sheets-Sheet 1

INVENTOR.
GUSTAV A. PRUSER,
BY
McMorrow, Berman + Davidson
ATTORNEYS.

April 21, 1953 G. A. PRUSER 2,635,407
COTTON HARVESTING MACHINE
Filed Dec. 12, 1950 3 Sheets-Sheet 3

INVENTOR.
GUSTAV A. PRUSER,
BY
McMorrow, Berman + Davidson
ATTORNEYS

Patented Apr. 21, 1953

2,635,407

UNITED STATES PATENT OFFICE 2,635,407

COTTON HARVESTING MACHINE

Gustav A. Pruser, Winters, Tex.

Application December 12, 1950, Serial No. 200,408

5 Claims. (Cl. 56—14)

This invention relates to a cotton harvesting machine adapted to strip the cotton from the stalk in the field.

An object of this invention is to provide a cotton harvester which, upon movement across the field planted with rows of cotton plants, is adapted to pick upwardly along opposed sides of the plants to thereby effectively strip the fibrous lint of the open bolls of the plants.

Another object of this invention is to provide a cotton harvester including stripping units for receiving the cotton lint and a closed suction system for removing the lint from the stripping units and conveying the lint to a suitable storage container.

A further object of this invention is to provide a cotton harvester including spaced stripping units which are adapted to strip upwardly along opposed sides of the plants to be stripped in a manner wherein the plants are not uprooted or damaged.

A still further object of this invention is to provide a cotton harvester which is adapted to selectively and simultaneously engage opposed sides of plants to be stripped at different levels, to thereby effectively strip the fibrous lint of the open bolls without uprooting the plants.

A still further object of this invention is to provide a cotton harvester adapted to be mounted as an attachment on a tractor or other motor-driven vehicle to be driven by a power take-off from the motor of its supporting vehicle.

A still further object of this invention is to provide a cotton harvester which is relatively simple in structure and cheap to manufacture.

The above and still further objects and advantages of the present invention will become apparent upon consideration of the following detailed description of the invention when taken in conjunction with the accompanying drawings, wherein:

Figure 6 is an enlarged fragmentary sectional view taken along the line 6—6 of Figure 4.

Figure 1:
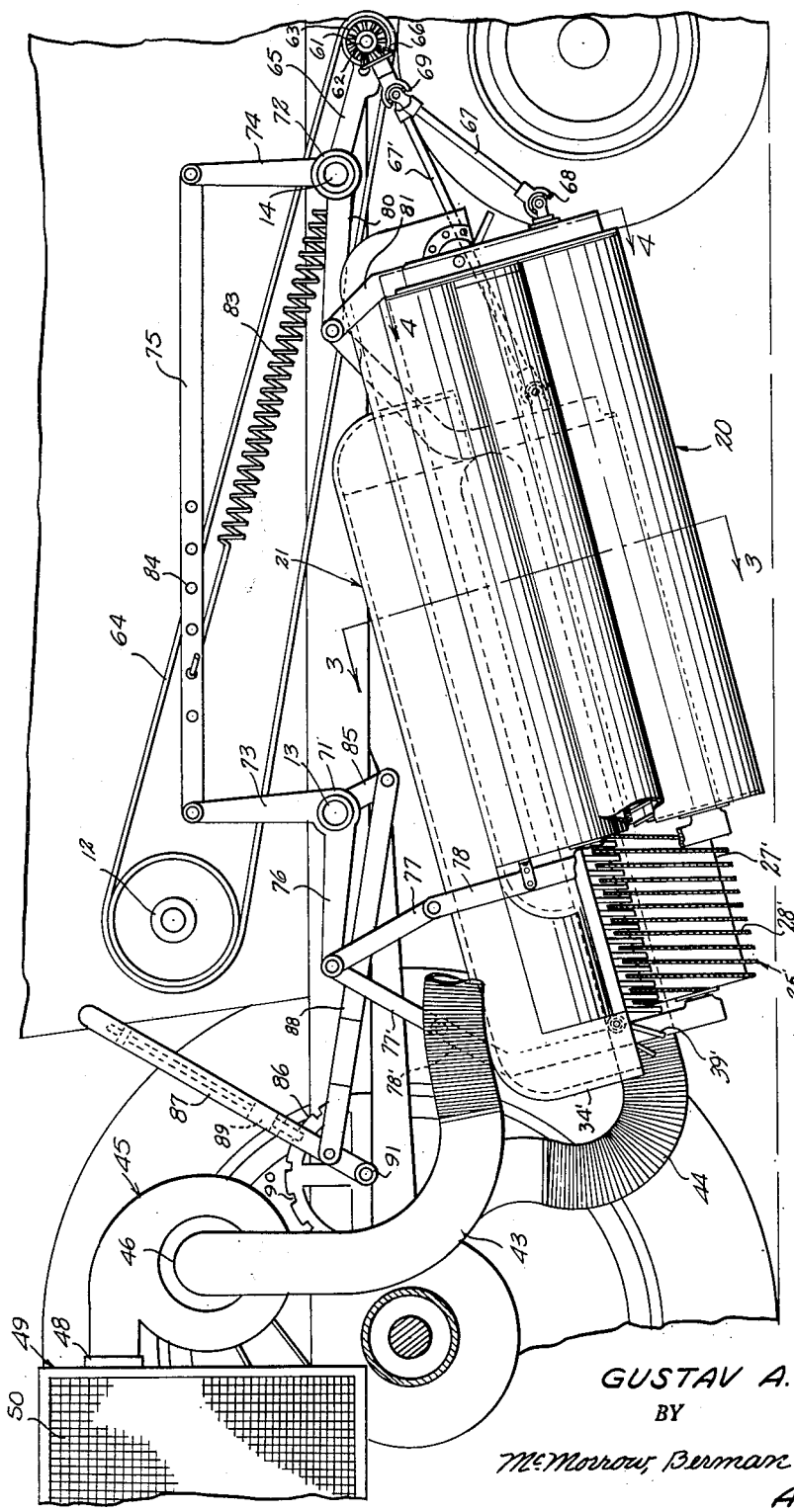
Figure 1 is a fragmentary side elevational view, with parts broken away and shown in section, of the cotton harvester of the present invention attached to a supporting vehicle.
Figure 2:
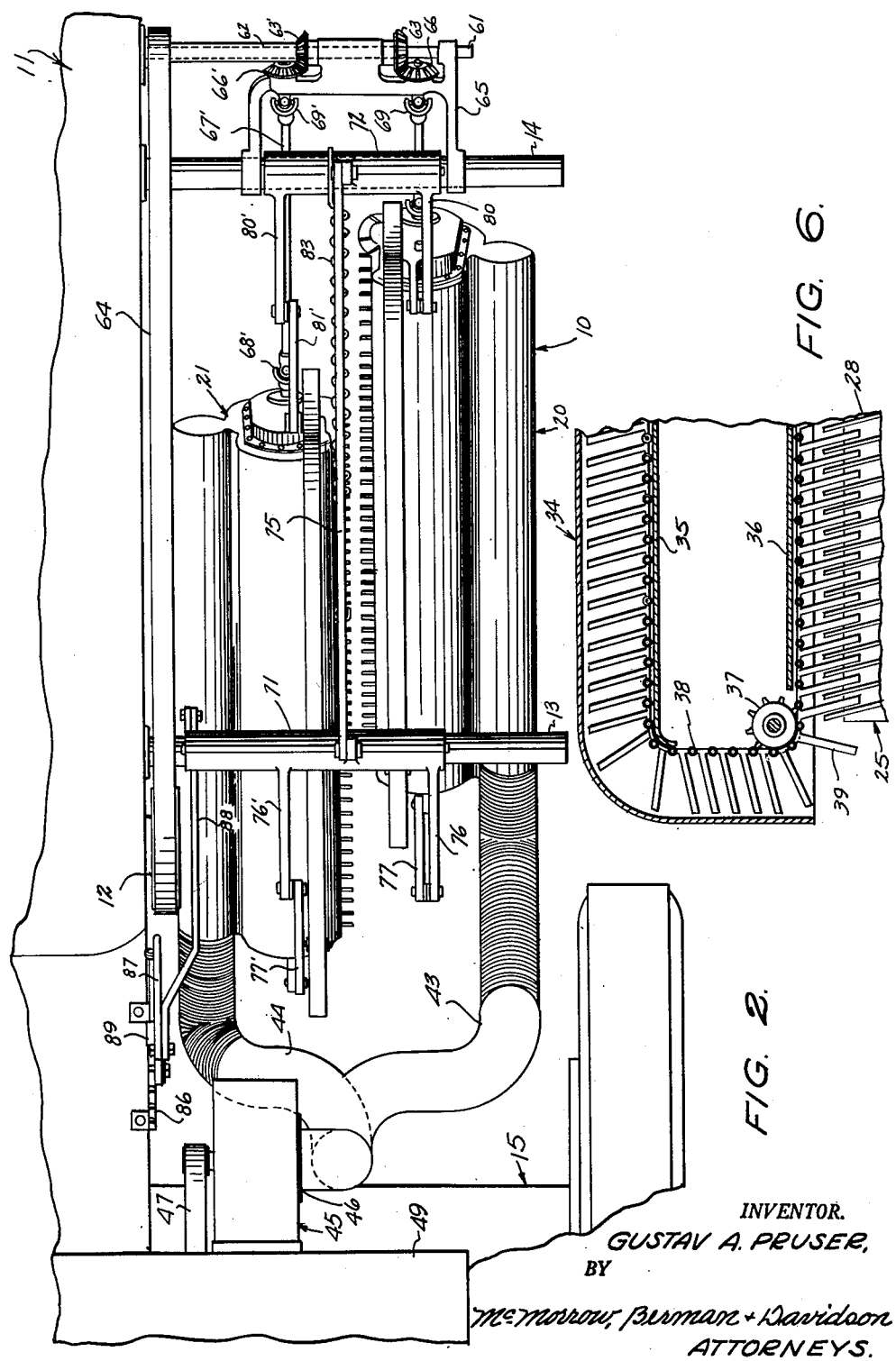
Figure 2 is a fragmentary top plan view of the assembly of the cotton harvester and the supporting vehicle shown in Figure 1.

Referring now more particularly to the drawings, wherein like reference numerals have been used throughout the several views to designate like parts, there is shown the cotton harvester of the present invention, generally designated by the reference numeral 10, which is adapted to be attached to a tractor 11 including a power take-off 12 and spaced supporting bars 13 and 14 projecting from one side thereof. The tractor 11 further includes the mobile frame 15 which is adapted to traverse a field planted with rows of cotton plants, the tractor being adapted to support any number of cotton harvesting units constructed according to the present invention.

The cotton harvester 10 includes a first stripping unit 20 which is inclined with respect to the field surface being traversed and supported longitudinally of the mobile frame 15 contiguous to and beneath the supporting bars 13 and 14. The first stripping unit 20 is engageable with one side of a row of cotton plants to be stripped, and the forward end of the stripping unit is spaced above the field surface, while the rearward end of the stripping unit is spaced below the forward end thereof. Supported in partially overlapping, spaced relation with respect to the first stripping unit is a second stripping unit 21 which is likewise inclined with respect to the field surface. Although the second stripping unit 21 partially overlaps the first stripping unit 20, it is to be noted that the forward end of the second stripping unit 21 is arranged at the same level as the forward end of the first stripping unit, while the rearward end of the second stripping unit is arranged at the same level with respect to the rearward end of the first stripping unit. The second stripping unit 21 is contiguous to and engageable with the other side of the row of cotton plants to be picked. As the machine traverses the field, the stripping unit 20, which includes a right hand spiral saw engages the right side of the row to be picked while the stripping unit 21, which includes a left hand spiral saw engages the left side of the row to be picked.

Since the stripping units 20 and 21 are of like structure, it will suffice to describe only one in detail. The stripping unit 20 includes a housing 22 having open inner sides and bottom and comprising a lower circular guard 23 and an upper circular guard 24. Disposed within the housing 22 contiguous to the lower circular guard 23 is a picking or stripping drum 25 which is mounted within the housing on the drum axle 26 for rotary movement about a first inclined axis. The picking drum 25 includes the cylindrical body 27 and the vertically extending, longitudinally spaced spiraling vanes 28. The outer periphery of each of the spiraling vanes is serrated, as indicated by the reference numeral 29, for engagement with the adjacent open bolls of the cotton plants. Spaced above and engaging the picking drum is a brush 30 which is mounted within the housing 22 contiguous to the upper circular guard 24 for rotary movement on the brush axle 31 about a second inclined axis spaced above the first inclined axis. The brush 30 includes the brush body 32 and the steel wire bristles 33 which project from the body 32 and are secured thereto, or formed integrally therewith. The steel wire bristles 33 serve a dual function, namely, they remove the cotton from the serrated vanes 28, and also keep the vanes clean when the same come into contact with gum and the like which is liable to collect on the vanes upon the vanes running against green foliage. The stripping unit 20 further embodies an inverted U-shaped stripping teeth housing 34, Figures 3 and 4, having their inner walls 35 and 36 forming spaced guideways, as shown in Figure 6. Rotatably mounted within the auxiliary housing 34 contiguous to the ends of the inner wall 36 are the sprocket wheels 37, the sprocket wheels 37 and the guide walls 35 and 36 cooperating to support a vertically disposed endless chain 38, having an upper flight adjacent the wall 35 and a lower flight adjacent the wall 36, and carrying the spaced teeth or ribs 39. As clearly shown in Figure 6, the spaced stripping teeth 39 on the lower flight of the chain 38 are engageable between adjacent vanes of the stripping drum, the teeth being mounted within the housing 34 for movement in a direction whereby the stripping teeth are moved longitudinally of the stripping drum 25 and along the spaced spiral vanes 28 thereof. Upon rotary movement of the stripping drum 25 and the brush 30 in the directions indicated by the arrows of Figure 3, the cotton lint will be removed from the bolls on the adjacent sides of the cotton plants and urged toward enclosed chamber 41 formed in the housing 22 on the side thereof remote from the open side. As the cotton lint is moved toward the enclosed chamber 41, the stripping teeth 39 cooperate with the spaced spiral vanes 28 in effecting the separation of the lint from the bolls. The corresponding parts of the stripping unit 21 are indicated by the same reference numerals used in identifying the parts of the stripping unit 20, the numerals of the stripping unit 21 being primed. Upon rotational movement of the stripping drum 25' in the direction illustrated by the arrow in Figure 3, and rotation of the brush 30' in the direction indicated by the arrow in Figure 3, cotton lint will be stripped from the adjacent side of the cotton plants and passed into the closed chamber 41' formed in the housing 22'. Connected in communication with one end of the chamber 41 is a flexible conduit 43 and connected in communication with the adjacent end of the chamber 41' of the stripping unit 21 is a flexible conduit 44 which is likewise connected in communication with the conduit 43. Suitable blower means are operatively connected to the conduits 43 and 44 for effecting the removal of the contents of the enclosed chambers 41, 41' of the stripping units 20 and 21. The blower means, as shown in Figure 1, embodies a suction blower 45 which is supported on the mobile frame 15 of the tractor 11, the blower including an intake 46 operatively connected in communication with the adjacent ends of the flexible conduits 43 and 44. The blower 45 is driven from any suitable source by the belt and pulley drive 47. The suction blower 45 includes an outlet 48 which is connected in communication with a storage bin 49, the storage bin including the serrated sides 50 permitting the blown air to escape, leaving the cotton lint within the storage bin.

Figure 3:
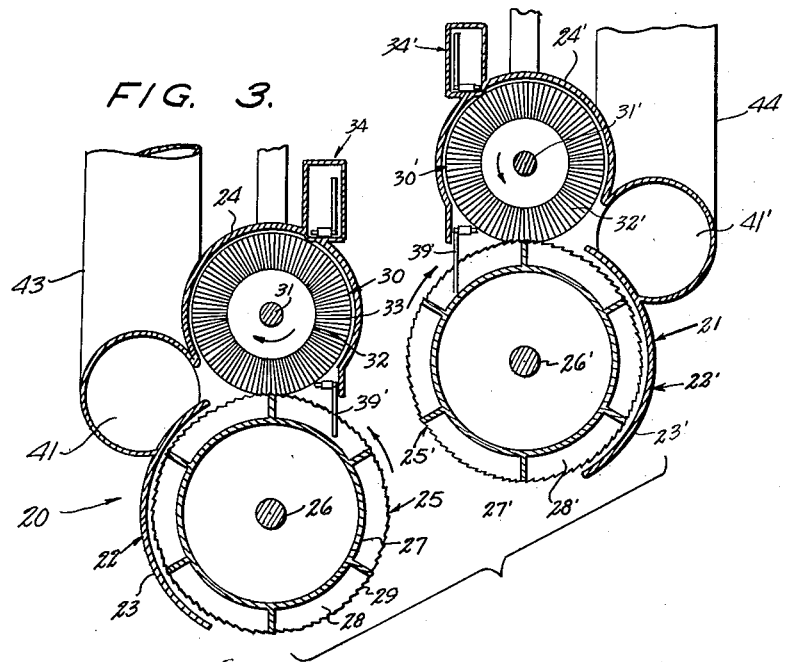
Figure 3 is an enlarged sectional view taken along the line 3—3 of Figure 1.

Suitable means are operatively connected to the stripping drum 25 and the brush 30 of the stripping unit 20 for effecting the rotary movement of the stripping drum 25 about the first inclined axis in the direction indicated in Figure 3, to strip the adjacent side of the row of cotton plants and for effecting the movement of the brush 30 about the second inclined axis in the opposite direction to urge the stripped cotton into the adjacent closed chamber 41. Similar means are operatively connected to the stripping drum 25' and the brush 30' of the stripping unit 21 for effecting the movement of the stripping drum 25' about the drum axle 26' in a direction to strip along the other side of the row of cotton plants, and for effecting the movement of the brush 30' about the brush axle 31' in the opposite direction to urge the stripped cotton into the enclosed chamber 41'. Since the structure for actuating each of the stripping units 20 and 21 is the same, it will suffice to describe only one in detail. Secured to the forward end of the housing 22 of the stripping unit 20 is a gear housing 51. Journaled transversely of the gear housing 51 is a stub shaft 52 carrying a drive gear 53 and a toothed sprocket wheel 58, the stub shaft having one end secured to the adjacent drum axle 26 and having the other end projecting exteriorly of the gear housing 51. Spaced from the stub shaft 52 is a stub shaft 54 which is likewise journaled transversely of the gear housing, the stub shaft 54 carrying a toothed sprocket wheel 55 and a bevel gear 56. In meshing engagement with the bevel gear 56 is another bevel gear 57 which is operatively connected to the sprocket wheel 37 for driving chain 38 in the direction whereby the stripping teeth 39 are moved longitudinally of the stripping drum 25 and along the spaced spiral vanes 28. The sprocket wheel 58 of the stub shaft 52 is connected to the sprocket wheel 55 of the stub shaft 54 by means of an endless chain 59. Accordingly, the stripping drum 25 and the stripping teeth 39 are operatively connected together and actuable in response to the rotary movement of the stub shaft 52.

Disposed transversely of the stub shaft 52 is a rocking arm 93 which has one end pivotally supported in the shaft 52 and has the other end provided with an enlarged head 94. Arranged in spaced, parallel relation with respect to the stub shaft 52 is another stub shaft 95 which has one end secured to the arm 93 contiguous to the head 94, the shaft 95 supporting a pinion 96 in meshing engagement with the drive gear 53 and a large pulley 97.

Figures 4, 5:
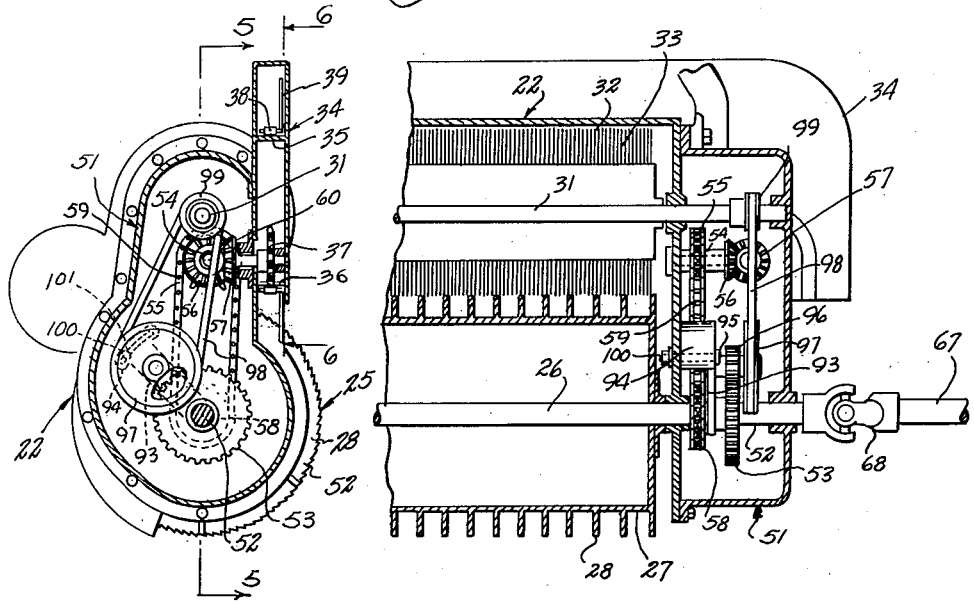
Figure 4 is an enlarged sectional view taken along the line 4—4 of Figure 1.
Figure 5 is a fragmentary enlarged sectional view taken along the line 5—5 of Figure 4.

As clearly shown in Figure 5, the adjacent end of the brush axle 31 is journaled within the gear housing 51 and is coupled to the large pulley 97 by means of an endless belt 98 which is trained about the pulley 99 carried by the brush axle 31 and the pulley 97. To maintain the belt 98 under a desired tension, the rocking arm 93 is secured in a select position of its rocking movement by means of a bolt 100 which extends through an arcuate slot 101 provided in the head 94 and is secured to the adjacent wall of the housing 51. It is to be noted that the rocking arm 93 and associated structure provide means whereby a desired tension can be maintained on the belt 98, which normally stretches in use. Accordingly, the stripping drum 25, brush 30 and the stripping teeth 39 are all operatively connected together and actuable in response to the rotary movement of the stub shaft 52 carrying the drive gear 53.

The stub shaft 52 is driven from the power take-off 12 by means of a structure to be now described. Projecting from the adjacent side of the mobile tractor frame 15 is a supporting rod 61 which carries a rotatably supported driven sleeve 62 having secured thereto a driven bevel gear 63. The driven sleeve 62 is actuated from the power take-off 12 by means of the belt-and-pulley coupling generally designated by the reference numeral 64. Mounted between the adjacent cross bar 14 and the supporting rod 61 is a gear frame 65 which supports the pinion gear 66 in meshing engagement with the bevel gear 63. The pinion gear 66 is operatively connected to the stub shaft 52 by means of the connecting shaft 67 and the universal joints 68 and 69. Accordingly, upon rotation of the driven sleeve 62 from the power take-off 12, the bevel pinion 66 is rotated, the coupling of the connecting shaft 67 is rotated, and the respective components of the stripping unit 20 are actuated. Similarly, the stripping unit 21 is driven by means of the bevel gear 63' carried by the driven sleeve 62, the bevel pinion 66' in meshing engagement with the bevel gear 63', the connecting shaft 67' and the universal joints 68' and 69'.

Suitable means are carried by the cross braces 13 and 14 of the tractor 11 and operatively connected to the stripping units 20 and 21 for supporting same and for mounting the stripping units for simultaneous movement toward and away from the field surface. The structure for mounting the stripping units includes the rotatably supported sleeves 71 and 72 supported on the cross braces 13 and 14. The sleeves 71 and 72 are connected together for simultaneous rotary movement by means of the upstanding arms 73 and 74 carried by the sleeves 71 and 72, and the connecting link 75 which is pivotally supported between the free ends of the arms 73 and 74. The sleeve 71 is operatively connected to the lower end of the stripping unit 20 by means of the rearwardly projecting fixed arm 76 and the pivotally connected linkages 77 and 78. Similarly, the sleeve 71 is connected to the outermost end of the stripping unit 21 by means of the rearwardly projecting fixed arm 76' and the pivotally connected links 77' and 78'. Accordingly, upon effecting the clockwise movement of the sleeve 71 about the cross brace 13, the rearward end of each of the stripping units 20 and 21 will be elevated with respect to the field surface. A suitable operative connection is provided between the sleeve 72 supported on the cross brace 14 and the adjacent forward ends of the stripping units 20 and 21 for simultaneously effecting the movement of the forward ends in response to the movement of the rearward ends of the stripping units. An arm 80 is fixed to the sleeve 72, the arm being connected to the adjacent forward end of the stripping unit 20 by means of the pivoted linkage 81. Similarly, another arm 80' is fixed to the sleeve 72 and operatively connected to the adjacent upper end of the stripping unit 21' by linkage 81'. Since the sleeves 71 and 72 are operatively connected to each other for simultaneous movement, rotary movement of the sleeve 71 in a clockwise direction will move the stripping units 20 and 21 away from the field surface and movement of the sleeve 71 in a counterclockwise direction will effect the movement of the stripping units toward the field surface.

Suitable resilient means are operatively connected to the stripping units for supporting the units in a select position of their movement toward the field surface. As clearly shown in Figure 1, a tension spring 83 is operatively connected between the connecting links 75 and the sleeve 72. It is to be noted that the point of connection to the connecting link 75 of the spring 83 can be varied, since the connecting link is provided with longitudinally spaced apertures 84. The spring 83 normally biases the sleeves 71 and 72 into a select position of their movement against the oppositely directed force exerted by the weight of the stripping units. By properly selecting the spring 83, a desired operating position of the stripping units 20 and 21 may be obtained.

Manually actuable means operable contiguous to the suction blower 45 on the mobile tractor frame 15 are operatively connected to the stripping units for moving the same into a select position of their movement away from the field surface. As clearly shown in Figure 1, the rotatable sleeve 71 is provided with a downwardly depending extension 85 and the tractor frame 15 is provided with an arcuate keeper 86. Pivotally supported contiguous to the keeper 86 is a lever 87 which is operatively connected to the extension 85 by means of the pivoted linkage 88. The lever 87 carries a latch piece 89, the latch piece normally riding along the arcuate keeper 86 and being selectively engageable within notches 90 provided in the keeper 86. Upon effecting the counterclockwise movement of the lever 87 about the pivotal axis 91 thereof, a clockwise rotary movement is imparted to the sleeve 71 which urges the stripping units away from the field surface. When it is desired to move the cotton stripper from place to place, it is merely necessary to move the lever 87 in a counterclockwise direction until the latch piece 89 engages within the notches 90 of the keeper 86, and the stripping units 20 and 21 will be held in a position spaced above the ground surface and out of the normally resiliently supported position.

It is apparent to one skilled in the art that the pair of stripping units 20 and 21 can be supported contiguous to each side of the mobile tractor frame to thereby particularly adapt the harvester for simultaneously stripping two spaced rows of cotton. It is to be further noted that two pairs of coacting stripping units can be supported contiguous to each side of the tractor to thereby adapt the device for simultaneously stripping four spaced rows of cotton. Under actual operating conditions, the stripping units 20 and 21 will engage opposite sides of a row of cotton to be picked, and urge the cotton into the enclosed chambers 41 and 41', whereupon the suction blower 45 effects the removal of the stripped cotton from the chambers and carries the stripped cotton into the storage bin 49 carried on the tractor frame 15.

In the construction of the picking drums 25, illustrated in Figure 1 of the drawings, six spiraled, serrated vanes 28 are secured longitudinally of the body 27, each of the vanes traversing the cotton plants from top to bottom in response to the forward movement of the harvester. The movement of the serrated vanes or saws 28 is timed with respect to the forward movement of the harvester to thereby ensure the vanes entering each of the cotton plants at the top thereof, running down the plant, and leaving the bottom of the plant in the same manner as the entry to the top thereof. Furthermore, the movement of the chain 38 carrying the ribs 39 is timed with respect to the rotary movement of the picking drum to ensure the ribs moving longitudinally of the drum intermediate the spiraled vanes 28, in response to the forward movement of the harvester. The ribs 39 cooperate with the vanes to keep leaves, burs, and other foreign matter out of the cotton-receiving chamber 41. It is to be understood that any number of spiral vanes 28 may be employed, the vanes being arranged at any inclination with respect to the longitudinal axis of the supporting body 27.

It is readily apparent that numerous other modifications of the cotton harvester of the present invention can be made without departing from the spirit of the invention as set forth in the appended claims.

What I claim is:

1. In a cotton harvester for attachment to a tractor including a mobile frame and a power takeoff, a pair of stripping units arranged in longitudinal spaced and partially overlapping relation with respect to each other and to said tractor inwardly of the forward end of the latter and supported on said tractor at an angle with respect to a ground surface, the forward ends of said stripping units being spaced a greater distance from said ground surface than the rearward ends thereof, each of said stripping units comprising a longitudinally extending housing having one side open, the open sides of said housings facing each other, a drum positioned longitudinally of and within each of said housings and supported therein for opposite rotary movement relative to each other about a separate axis inclined with respect to said ground surface, a plurality of vanes arranged in spiral relation about the outer periphery of each of said drums and carried thereby, the angle of inclination of each of said drum axes being such that the vanes of said drums lie in substantially vertical planes, a brush positioned longitudinally within each of said housings and spaced above the adjacent drum and mounted for rotary movement about an axis parallel to said inclined axis of said adjacent drum, a conduit extending longitudinally of each of said housings and in communication therewith, blower means being connected to each of said conduits, and means operatively connecting said power takeoff and each of said drums and brushes for effecting the individual rotary movement thereof, each of said drums rotating about its inclined axis in a direction to strip upwardly the opposite sides of the plants of a row, each of said brushes rotating about its inclined axis in a direction opposite to that of the adjacent drum to urge the stripped cotton into the adjacent one of said conduits.

2. In a cotton harvester for attachment to a tractor including a mobile frame and a power takeoff, a pair of stripping units arranged in longitudinal spaced and partially overlapping relation with respect to each other and to said tractor inwardly of the forward end of the latter and supported on said tractor at an angle with respect to the ground surface, the forward ends of said stripping units being spaced a greater distance from said ground surface than the rearward ends thereof, each of said stripping units comprising a longitudinally extending housing having one side open, the open sides of said housing facing each other, a drum positioned longitudinally of and within each of said housings and supported therein for opposite rotary movement relative to each other about a separate axis inclined with respect to said ground surface, a plurality of vanes arranged in spiral relation about the outer periphery of each of said drums and carried thereby, the angle of inclination of each of said drum axes being such that the vanes of said drums lie in substantially vertical planes, a brush positioned longitudinally within each of said housings and spaced above the adjacent drum and mounted for rotary movement about an axis parallel to said inclined axis of said adjacent drum, an endless chain rotatable in a vertical plane and positioned longitudinally of each of said housings and having the lower flight contiguous to and in parallel spaced relation with respect to the adjacent drum, a plurality of teeth arranged in spaced relation along said endless chain and having one end fixedly secured thereto, the portions of the teeth inwardly of the other end on the lower flight of said chain being engageable between adjacent vanes of the contiguous drum, means operatively connecting each of said endless chains to said power takeoff for effecting the rotary movement of said chains, a conduit extending longitudinally of each of said housings and in communication therewith, blower means being connected to each of said conduits, and means operatively connecting said power takeoff and each of said drums and brushes for effecting the individual rotary movement thereof, each of said drums rotating about its inclined axis in a direction to strip upwardly the opposite sides of the plants of a row, each of said brushes rotating about its inclined axis in a direction opposite to that of the adjacent drum to urge the stripped cotton into the adjacent one of said conduits.

3. In a cotton harvester for attachment to a tractor including a mobile frame and a power takeoff, a pair of stripping units arranged in longitudinal spaced and partially overlapping relation with respect to each other and to said tractor inwardly of the forward end of the latter and supported on said tractor at an angle with respect to the ground surface, the forward ends of said stripping units being spaced a greater distance from said ground surface than the rearward ends thereof, each of said stripping units comprising a longitudinally extending housing having one side open, the open sides of said housing facing each other, a drum positioned longitudinally of and within each of said housings and supported therein for opposite rotary movement relative to each other about a separate axis inclined with respect to said ground surface, a plurality of vanes arranged in spiral relation about the outer periphery of each of said drums and carried thereby, the angle of inclination of each of said drum axes being such that the vanes of said drums lie in substantially vertical planes, a brush positioned longitudinally within each of said housings and spaced above the adjacent drum and mounted for rotary movement about an axis parallel to said inclined axis of said adjacent drum, an endless chain rotatable in a vertical plane and positioned longitudinally of each of said housings and having the lower flight contiguous to and in parallel spaced relation with respect to the adjacent drum, a plurality of teeth arranged in spaced relation along said endless chain and having one end fixedly secured thereto, the portions of the teeth inwardly of the other end on the lower flight of said chain being engageable between adjacent vanes of the contiguous drum, means operatively connecting each of said endless chains to said power takeoff for effecting the rotary movement of said chains, a conduit extending longitudinally of each of said housings and in communication therewith, blower means being connected to each of said conduits, and means operatively connecting said power takeoff to each of said drums, brushes, and chains and synchronizing the rotary movement of each of said drums with the movement of said tractor so that the horizontal velocity components of said tractor and the vanes carried by each of said drums are equal but opposite in direction, each of said drums rotating about its inclined axis in a direction to strip upwardly the opposite sides of the plants of a row, each of said brushes rotating about its inclined axis in a direction opposite to that of the adjacent drum to urge the stripped cotton into the adjacent one of said conduits.

4. In a cotton harvester for attachment to a tractor including a mobile frame and a power takeoff, a pair of stripping units arranged in longitudinal spaced and partially overlapping relation with respect to each other and to said tractor inwardly of the forward end of the latter and supported on said tractor at an angle with respect to the ground surface, the forward ends of said stripping units being spaced a greater distance from said ground surface than the rearward ends thereof, each of said stripping units comprising a longitudinally extending housing having one side open, the open sides of said housing facing each other, a drum positioned longitudinally of and within each of said housings and supported therein for opposite rotary movement relative to each other about a separate axis inclined with respect to said ground surface, a plurality of vanes arranged in spiral relation about the outer periphery of each of said drums and carried thereby, the edge of each of said vanes being serrated, the vanes on one of said drums being mounted in a left handed spiral and the vanes on the other of said drums being mounted in a right handed spiral so that the vanes move in a horizontal direction opposite to that of the tractor, the angle of inclination of each of said drum axes being such that the vanes of said drums lie in substantially vertical planes, a brush positioned longitudinally within each of said housings and spaced above the adjacent drum and mounted for rotary movement about an axis parallel to said inclined axis of said adjacent drum, an endless chain rotatable in a vertical plane and positioned longitudinally of each of said housings and having the lower flight contiguous to and in parallel spaced relation with respect to the adjacent drum, a plurality of teeth arranged in spaced relation along said endless chain and having one end fixedly secured thereto, the portions of the teeth inwardly of the other end on the lower flight of said chain being engageable between adjacent vanes of the contiguous drum, means operatively connecting each of said endless chains to said power takeoff for effecting the rotary movement of said chains, a conduit extending longitudinally of each of said housings and in communication therewith, blower means being connected to each of said conduits, and means operatively connecting said power takeoff to each of said drums, brushes, and chains and synchronizing the movement of each of said drums with the movement of said tractor so that the horizontal velocity components of said tractor and the vanes carried by each of said drums are equal but opposite in direction, each of said drums rotating about its inclined axis in a direction to strip upwardly the opposite sides of the plants of a row, each of said brushes rotating about its inclined axis in a direction opposite to that of the adjacent drum to urge the stripped cotton into the adjacent one of said conduits.

5. In a cotton harvester for attachment to a tractor including a mobile frame and a power takeoff, a pair of stripping units arranged in longitudinal spaced and partially overlapping relation with respect to each other and to said tractor inwardly of the forward end of the latter and supported on said tractor at an angle with respect to the ground surface, the forward ends of said stripping units being spaced a greater distance from said ground surface than the rearward ends thereof, each of said stripping units comprising a longitudinally extending housing having one side open, the open sides of said housing facing each other, a drum positioned longitudinally of and within each of said housings and supported therein for opposite rotary movement relative to each other about a separate axis inclined with respect to said ground surface, a plurality of vanes arranged in spiral relation about the outer periphery of each of said drums and carried thereby, the edge of each of said vanes being serrated, the vanes on one of said drums being mounted in a left handed spiral and the vanes on the other of said drums being mounted in a right handed spiral so that the vanes move in a horizontal direction opposite to that of the tractor, the angle of inclination of each of said drum axes being such that the vanes of said drums lie in substantially vertical planes, a brush positioned longitudinally within each of said housings and spaced above the adjacent drum and mounted for rotary movement about an axis parallel to said inclined axis of said adjacent drum, an endless chain rotatable in a vertical plane and positioned longitudinally of each of said housings and having the lower flight contiguous to and in parallel spaced relation with respect to the adjacent drum, a plurality of teeth arranged in spaced relation along said endless chain and having one end fixedly secured thereto, the portions of the teeth inwardly of the other end on the lower flight of said chain being engageable between adjacent vanes of the contiguous drum, means operatively connecting each of said endless chains to said power takeoff for effecting the rotary movement of said chains, a conduit extending longitudinally of each of said housings and in communication therewith, blower means being connected to each of said conduits, means operatively connecting said power takeoff to each of said drums, brushes, and chains and synchronizing the movement of each of said drums with the movement of said tractor so that the horizontal velocity components of said tractor and the vanes carried by each of said drums are equal but opposite in direction, each of said drums rotating about its inclined axis in a direction to strip upwardly the opposite sides of the plants of a row, each of said brushes rotating about its inclined axis in a direction opposite to that of the adjacent drum to urge the stripped cotton into the adjacent one of said conduits, means operatively connecting said frame and each of said stripper units for effecting the simultaneous movement of the latter toward and away from the ground surface, and resilient means operatively connecting the forward and rearward ends of said stripper units so as to counterbalance the weight of said stripper units.

GUSTAV A. PRUSER.

References Cited in the file of this patent
UNITED STATES PATENTS

| Number | Name | Date |
| --- | --- | --- |
| 1,213,529 | Neil | Jan. 23, 1917 |
| 2,451,130 | Towsend | Oct. 12, 1948 |
| 2,475,531 | Towsend | July 5, 1949 |

FOREIGN PATENTS

| Number | Country | Date |
| --- | --- | --- |
| 18,564 | Denmark | Mar. 16, 1914 |